Aug. 29, 1933. E. D. BARRINGER Re. 18,926

WINDOW CONSTRUCTION

Original Filed Aug. 10, 1931 4 Sheets-Sheet 1

Inventor

ELMER D. BARRINGER.

By Robb & Robb

Attorneys

Aug. 29, 1933. E. D. BARRINGER Re. 18,926
WINDOW CONSTRUCTION
Original Filed Aug. 10, 1931 4 Sheets-Sheet 2
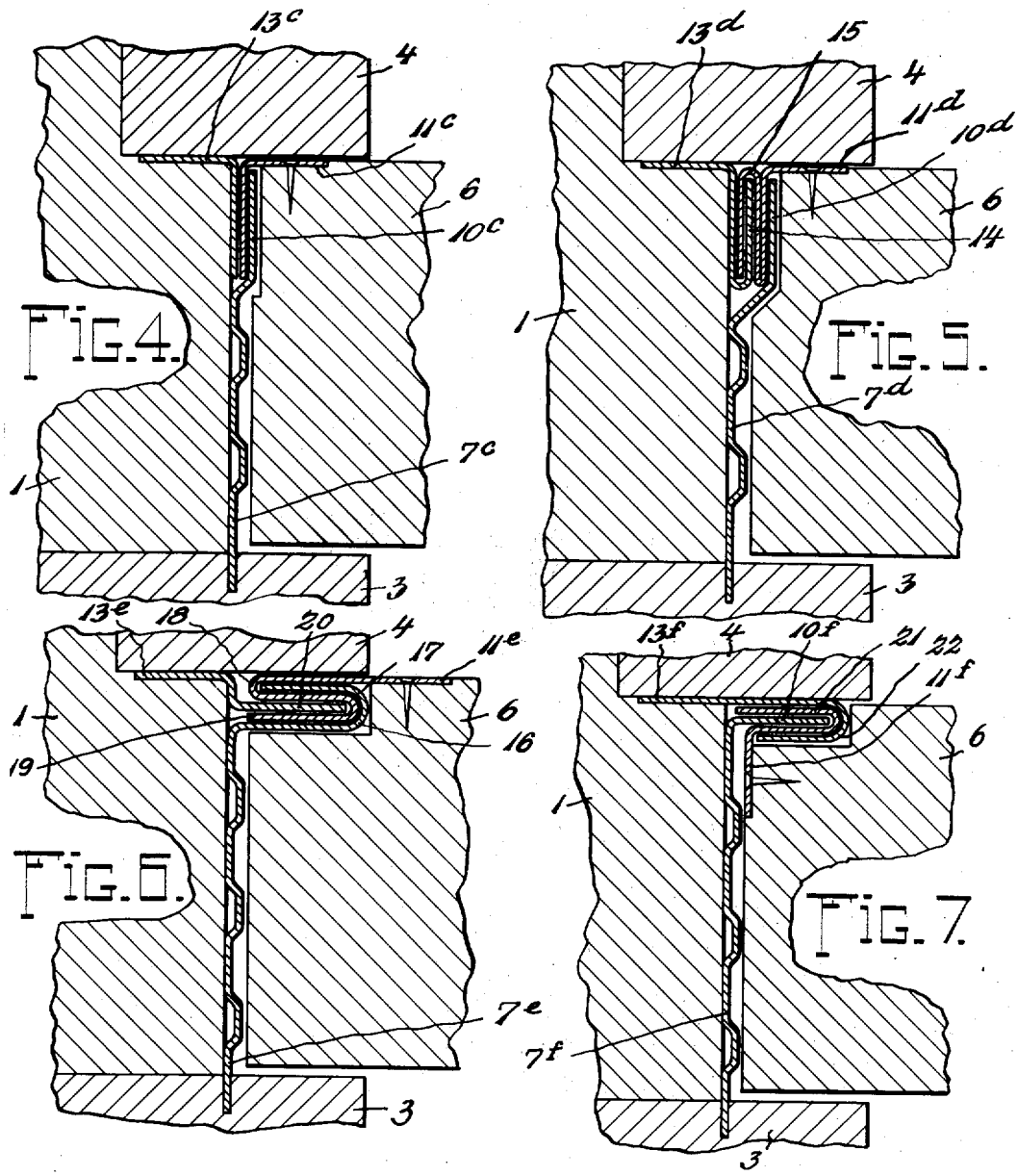
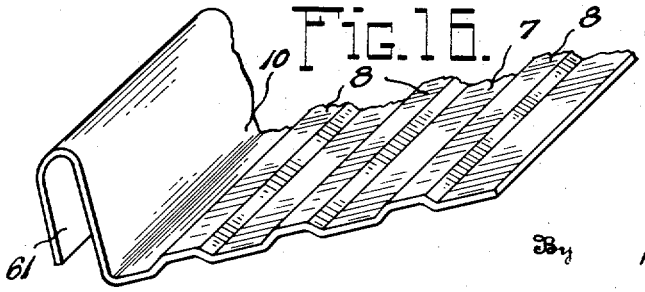
Inventor
ELMER D. BARRINGER.
By Robbins & Robb
Attorneys Aug. 29, 1933. E. D. BARRINGER Re. 18,926

WINDOW CONSTRUCTION

Original Filed Aug. 10, 1931 4 Sheets-Sheet 3

Inventor

ELMER D. BARRINGER.

By Robb & Robb

Attorneys

Aug. 29, 1933. E. D. BARRINGER Re. 18,926

WINDOW CONSTRUCTION

Original Filed Aug. 10, 1931 4 Sheets-Sheet 4

Inventor

ELMER D. BARRINGER.

By Robbs & Robbs

Attorneys

Reissued Aug. 29, 1933

Re. 18,926

UNITED STATES PATENT OFFICE 18,926

WINDOW CONSTRUCTION

Elmer D. Barringer, Cleveland, Ohio

Original No. 1,849,265, dated March 15, 1932, Serial No. 556,292, August 10, 1931. Application for reissue July 15, 1933. Serial No. 680,645

29 Claims. (Cl. 20—69)

Many forms of weatherstrips have been devised and are in wide use for making weathertight joints present in windows, doors, and similar devices where it is desired to protect completely the interior of a building from exterior weather conditions. Many forms of these strips serve efficiently the purposes for which they have been designed, but so far there have been none designed for efficiently excluding the weather, which will be self-compensating for differences between the parts of the joints or openings being protected arising from expansion and contraction of the cooperating parts, while, in the case of windows and the like, serving as a means for protecting the window frame against wear by reducing friction between the frame and sash and cushioning the sash to prevent rattling thereof.

The present invention relates to a window constuction in which there is employed a novel type of weatherstrip which is designed to accomplish the aforesaid desirable effects in a manner assuring the complete exclusion of all elements of the weather through the provision of a weatherstrip which is easily installed and easily manufactured.

The invention will be more readily understood by reference to the accompanying drawings, in which—

Figure 4 is a view similar to Figures 2 and 3, showing still a further modified form of strip.

Figure 5 is a view similar to the preceding views, illustrating a still further modification of the strip.

Figures 6 and 7 are views similar to the preceding views showing a modified form of strip suitable for somewhat different type of installation.

Figures 8 to 13 inclusive are also similar views showing still further modified forms of weather strip.

Figure 14:
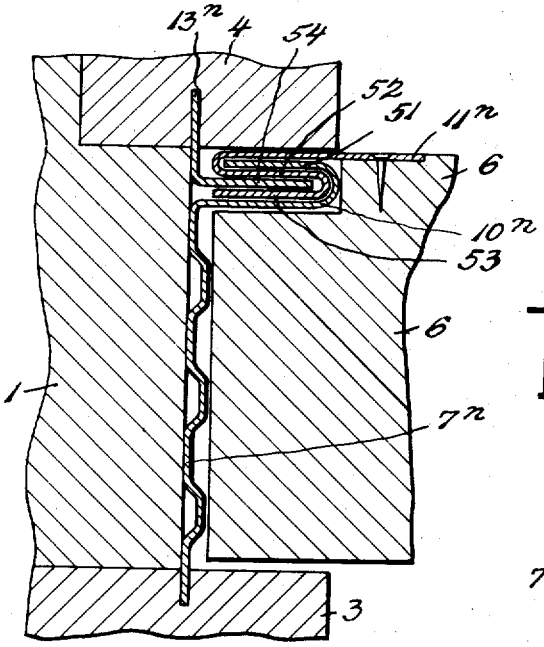
Figure 15:
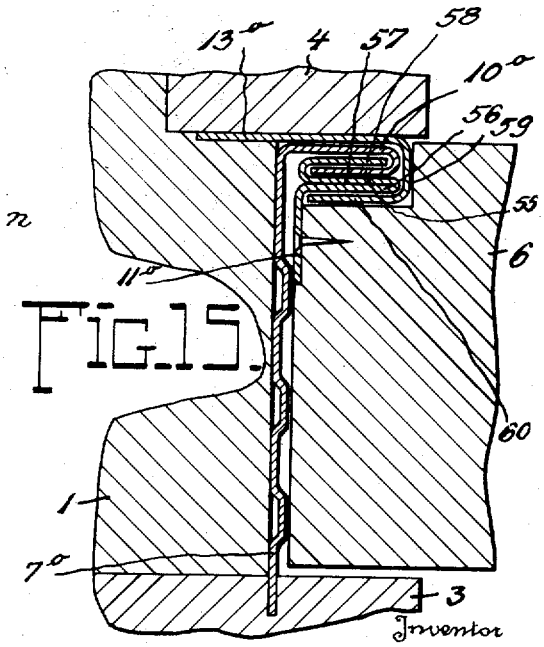

Figures 14 and 15 are views showing the modified form of strip of the general type illustrated in Figures 6 and 7, and Figure 16 is a perspective view of one form of a strip member which is suitable for insertion between the window sash and the window frame, and which will serve as a bearing surface to protect the window frame from wear when the sash is separated.

Figure 1:
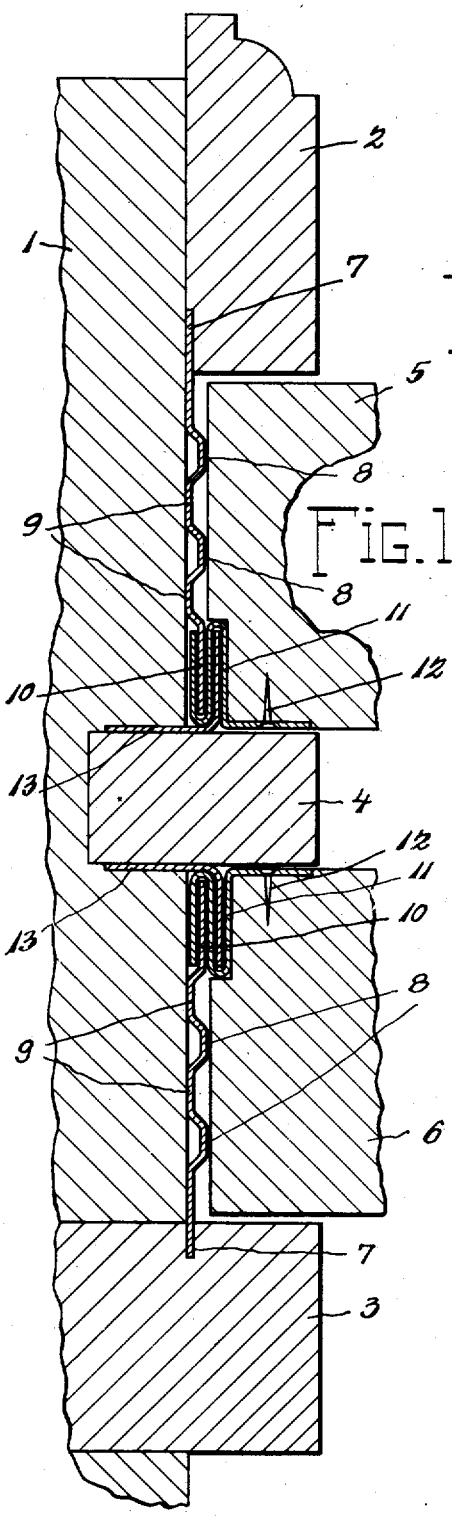
Figure 1 represents a section through a window construction embracing the features of the present invention, and showing the upper and lower window sashes provided with a form of weatherstrip made in accordance with this invention.

Referring more particularly to the drawings, and especially to Figure 1, numeral 1 represents the window frame, 2 and 3 are window stops, and 4 is a parting strip. Between the stop 2 and the parting strip 4 there operates a lower window sash 5, while between the stop 3 and the parting strip 4 there is an upper window sash 6. It will be understood that the window panes are carried by these sashes in the usual manner.

It will be observed that the joints between each sash and its cooperating parts are protected by a form of weatherstrip which is designed to effectively prevent the entrance of weather elements to the interior of the building through the cracks of the windows. Since the weatherstrip construction is duplicated for both upper and lower sashes, the construction of the strip for only one of these sashes will be given in detail, it being for this reason that only one sash is illustrated in each of Figures 2 to 15 inclusive.

Referring to Figure 1, it will be observed that the stop 2 is grooved along the surface abutting against the window frame 1, for the insertion of one end of the weatherstrip member 7, which is bent outwardly at portions indicated at 8 to serve as a guide and bearing member against which the sash 5 is adapted to slide as the sash is raised and lowered to the window frame. The remaining portions 9 intermediate the portions 8 rest against the frame 1, and since the weatherstrip member 7 is tightly held between the stop 2 and frame 1, it will be apparent that the provision of this strip member will effectively prevent any wearing on the frame 1 through operation of the window and also prevents binding of the window. It will be also noted that the strip member 7 terminates in a substantially straight end member 10.

It will also be seen that the sash 5 is grooved to receive a second weatherstrip member 11, which is secured to the sash by nails or screws, or other fastening means indicated at 12. This groove, of course, extends the height of the window sash and on each side, and its depth is such as to properly accommodate the parts of the weatherstrip assembly. It will be seen in this form of the strip that the member 11 is bent into a substantially S form, the legs of which are substantially parallel, forming a pair of channels into the outer one of which the end 10 of the strip member 7 is received. It will also be seen that the window frame 1 is grooved to frictionally receive between itself and the parting strip 4 a third weatherstrip member 13 which is shaped in the form of an inverted L, one side of which projects into the inside channel of the member 11, suitably secured to prevent slipping, and if the width of the space between the window frame 1 and the sash 5 varies through swelling and contraction of the frame or sash, or both, there will result a corresponding effect upon the weatherstrip member 7 which will tend to force this member to close or open the clearance space between the sash and frame, such movement will be transmitted from the strip member 11 to the end 10 which will thus assure a self-adjustment of the parts of the strip to maintain at all times a complete closure of the cracks of the window.

Figure 2:
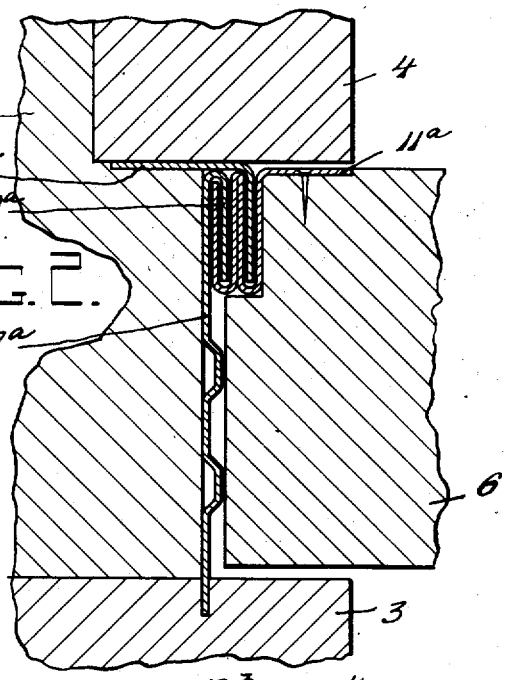
Figure 2 is a view similar to Figure 1, but showing a modified form of weatherstrip applied to one of the window sashes, specifically the upper sash, corresponding to the upper sash in Figure 1.

In the form illustrated in Figure 2, it will be observed that the strip member 7*a*, corresponding to the member 7 in Figure 1, has its upper end 10*a* bent in the form of an inverted U to provide a channel for the reception of the outer leg of the weatherstrip member 11*a* which is here bent in the form of an inverted M, forming inner and outer channels into which project the legs of the turned end 10*a* of the strip member 7*a* and the side of the third strip member 13*a* which is shaped in the form of an inverted L as in the construction of Figure 1. The stop 3 and the window frame 1 are grooved to frictionally receive and tightly hold the strip member 7*a* and 13*a* as previously described, the strip member 13*a* being tightly held between the window frame 1 and the parting strip 4 as previously described.

Figure 3:
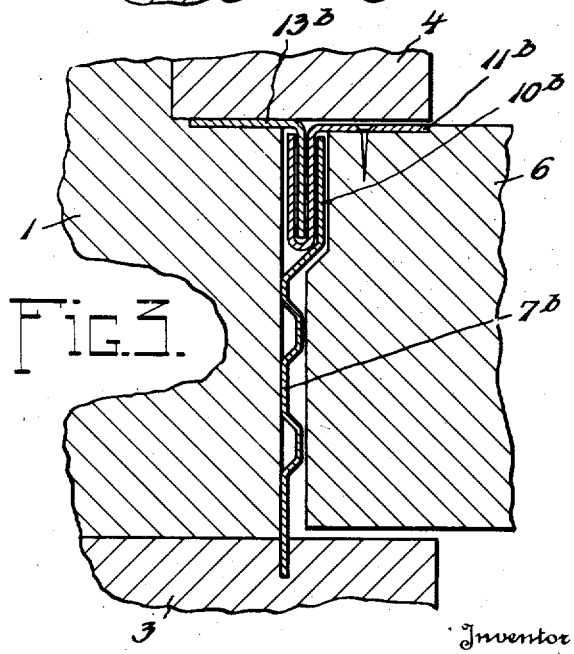
Figure 3 is a view similar to Figure 2 showing still another form of strip suitable for this purpose.

In Figure 3 the sash 6 is provided with a groove for the reception of the end 10*b* of the strip member 7*b*, corresponding to the strip member 7 and 7*a* of the precedingly described modifications. In this form of the device the strip member 11*b*, which is nailed or otherwise suitably secured to the sash 6, is bent downwardly and then upwardly to form a U-shaped channel, the end 10*b* of the strip member 7*b* being received between one leg of this U channel and the sash 6, while projecting into the U channel proper, is one side of the inverted L-shaped strip member 13*b*, the other side of which is frictionally held between the parting strip 4 and the window frame 1.

Figure 4 shows a somewhat simpler form of installation wherein the strip member 7*c* terminates in the straight end portion 10*c* which is received when installed between the sash 6 and one side of the L-shaped member 11*c* which is secured to the sash 6. It will be observed that in this instance the member 11*c* is simply bent at right angles and does not have its depending side bent back upon itself, but terminates in a straight member. As before, the member 11*c* is secured by nails or other fastening means to the sash 6. As before, a reverse and inverted L-shaped member 13*c* is secured between the parting strip 4 and the window frame 1. This member serves as a bearing to protect the member 11*c* from catching into the frame 1.

In Figure 5 the member 11*d*, nailed or otherwise secured to the sash 6, is bent at right angles downwardly and then folded back upon itself and then bent over to form a U-shaped channel, and in this modification the weatherstrip element 13*d* secured between the parting strip 4 and the window frame 1 has its depending side lengthened and upturned, as indicated at 14 to fit into the inverted U-shaped channel 15, formed by the fold in the depending side of the weatherstrip element 11*d*. There is also provided in this case the weatherstrip element 7*d* which terminates in the straight end portion 10*d* received between the window sash 6 and the depending side of the weatherstrip element 11*d*.

In Figures 6 and 7 there are shown two modifications of a generally different type of installation from that described in Figures 1 to 5 inclusive. It will be noted from the drawings that in Figures 6 and 7 the installation of the strip elements is in general at right angles to the form of installation shown in Figures 1 to 5 inclusive, although the elements making up the strip installation are generally the same as in the preceding illustrations.

In Figure 6, as before, the strip element 7*e* is secured in the groove cut in the stop 3, and is then bent inwardly as shown at 16 and then outwardly as at 17, forming a U-shaped channel. The weatherstrip member 11*e* is bent inwardly as indicated at 18 forming a U-shaped channel in which the portion 17 of the strip element 7*e* is received and is then bent outwardly at 19 forming a U-shaped channel which is for the reception of the end portion 20 of the strip element 13*e*, which is now bent into a Z-shape as will be apparent from Figure 6 but which is still frictionally retained between the parting strip 4 and the window frame 1. The weatherstrip member 11*e* is still fastened to the sash 6 by a nail or screw, or other fastening device, and is relatively deeply grooved for the reception of the bent portion of the three strip elements as will be apparent from the drawings. As will be noted, the groove and the sash member in this modification lies normal to the groove shown in Figures 1 to 5 inclusive, and properly accommodates the parts of the weatherstrip assembly.

It is also to be observed that the member 7*e* by virtue of its U-shaped portion 16, which is stationary with respect to the window frame, and which encloses the sealing surfaces 20 and 19 of the strips 13*e* and 11*e* respectively, acts as a housing for protecting the aforesaid sealing surfaces from direct exposure to the elements, as well as extraneous material such as grit, dust, etc. An additional advantage afforded by the housing may be pointed out by way of detailing a disadvantage that occurs where certain types of two-part strips are employed. In the two-part assemblies referred to, the sealing surface of the frame member is exposed, upon the raising of the sash, and as a result the frame strip is apt to receive a coat of paint when the painter touches up the sills and sash, unless particular care is exercised, and consequently the sealing surfaces bind and stick, and do not allow free movement to the sash. On the other hand, the dried particles of paint prevent an efficient seal and the strips do not effectively exclude the passage of air and foreign material. The painter, of course, cannot be expected to appreciate the damage which careless handling of the brush brings about, so that it may be said with reasonable assurance that the majority of weatherstrip jobs, particularly on new houses, are subject to a great loss in efficiency from this source.

Now by way of my third strip member which embodies a protective housing or sheath that on its outer surface affords no bearing or sliding contact with another part, and is stationary with respect to the frame, I am enabled to afford protection to the sealing surfaces of the other two strip members, either with each other or with the third strip against paint, dust, dirt, etc., and as far as coating is concerned, the painter does not have to exercise the care required for other types of strip assemblies. The outer part or housing may be given a coat of paint to beautify, as an ancillary advantage, the window and frame, by lending the same a similarity of color, and further, the paint affords a protection not ordinarily offered to such constructions.

It is also to be observed that in assemblies such as that shown in Figure 6, the member 13*e* may be omitted from the combination of parts without in any way destroying the seal between the sash and the frame and that the member 16 also presents an outer housing which protects the sealing surfaces of the parts 19 and 17. Under these conditions a two-part strip may be availed of, retaining the advantages of the protective housing.

In Figure 7 there is again the strip element 7*f* held in the groove in the window stop 3, and in this modification the strip element 11*f* is secured to the sash 6 between the sash and the frame 1. This strip 11*f* is extended up into the recess provided in the sash 6 being bent inwardly and then outwardly to form a U-shaped channel 21 in which channel is received the inwardly projecting end 10*f* of the strip member 7*f*. In this form the strip member 13*f* is frictionally secured between the parting strip 4 of the window frame 1 as in the previous cases, but extends inwardly and is then bent downwardly and outwardly as indicated at 22 to form a U-shaped channel enclosing a bent portion of the other two window strip elements.

Figures 8 to 13 inclusive show a type of installation generally similar to that shown in Figures 1 to 5 inclusive.

Figure 8:
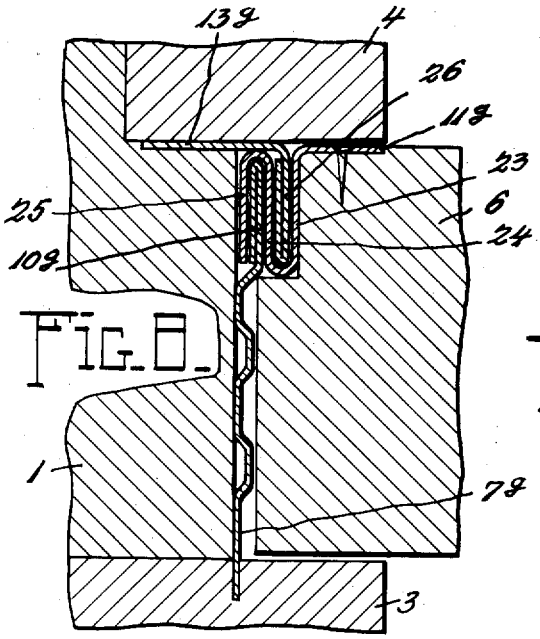

In Figure 8 the strip 7*g* is again held in the groove in the stop 3 and terminates in the end portion 10*g* which is bent flatly upon itself. The weather strip element 11*g* is secured to the sash intermediate the sash 6 and parting strip 4 and is bent downwardly to form a depending leg 23, and then upwardly forming the upstanding leg 24, and then downwardly again forming the depending leg 25. Between the legs 23 and 24 there is thereby formed a U-shaped channel which receives the depending side 26 of the weatherstrip member 13*g* which is again frictionally held between the parting strip 4 and the window frame member 1. The end 10*g* is interlocked with the member 11*g* in the channel between the legs 24 and 25.

Figure 9:
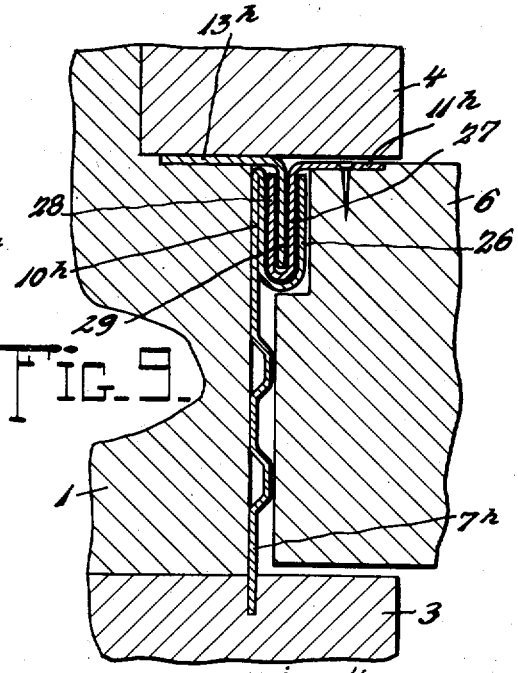

In Figure 9 the weatherstrip element 7*h* is secured along the runway in the window stop member 3 and has its end 10*h* bent flatly back upon itself and upwardly as shown at 26 forming a U-shaped channel for the reception of a second U-shaped channel formed by bending the weatherstrip member 11*h* first downwardly, as at 27, and then upwardly as at 28, there being received within this channel formed between the sides 27 and 28 the depending leg 29 formed by bending the strip 13*h* at right angles downwardly. In this form of weatherstrip, the member 26 acts as a protective housing or sheath and is possessed of the attributes set out therefor as in Figure 6.

Figure 10:
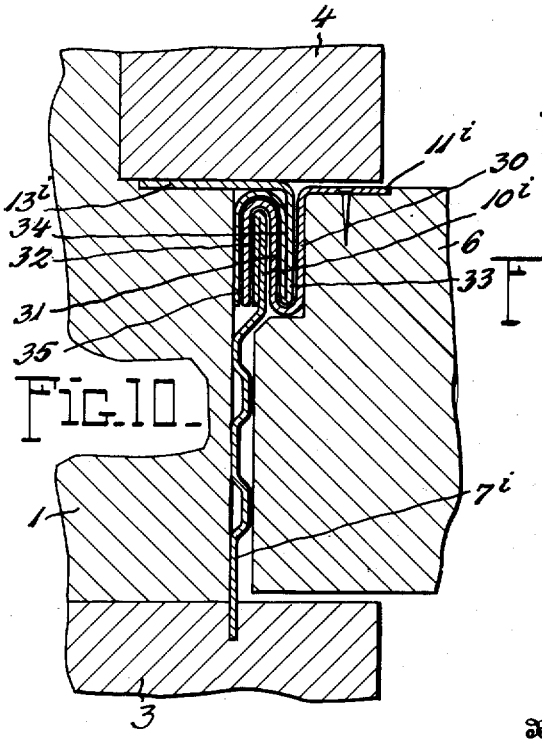

In Figure 10, the weatherstrip member 7*i* has its end portion 10*i* bent flatly down upon itself and the weatherstrip 11*i* is bent downwardly as shown at 30, then upwardly as at 31, and downwardly again at 32. The third weatherstrip element 13*i* is bent downwardly as shown at 33, then flatly back against itself as at 34, and then downwardly to form the leg 35. It will be seen that the channel defined between the legs 30 and 31 encloses the portions 33 and 34 of the weatherstrip member 13*i* and the inverted channel formed between the legs 31 and 32 encloses the end 10*i* of the weatherstrip 7*i*, the side 35 of the weatherstrip element 13*i* being positioned between the side 32 of the weatherstrip element 11*i* and the window frame 1.

Figure 11:
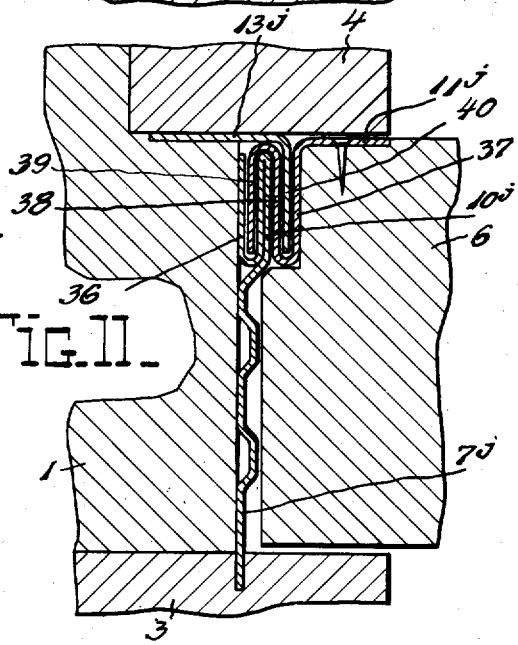

In Figure 11 the weatherstrip 7*j* is as before secured in the groove in the window stop 3, and has its end 10*j* folded flatly downwardly upon itself and then upwardly to form the side 36 which bears against the window frame 1. The weatherstrip element 11*j* is again secured to the sash 6 and is bent downwardly to form the side 37, and then upwardly to form the side 38, and then downwardly to form the side 39. It will therefore be seen that there is a U-shaped channel formed between the sides 37 and 38 and an inverted U-shaped channel between the sides 38 and 39. As before, between the parting strip 4 and the window frame there is positioned a weatherstrip element 13*j* which is bent downwardly at 40 to form a leg projecting to the U-shaped channel between the sides 37 and 38 of the weatherstrip element 11*j*, the side or leg 39 of the weatherstrip element 13*j* being positioned in the channel formed between the ends 10*j* and the side 36 of the weatherstrip element 7*j*, thus the bent-over end 10*j* being positioned in the inverted channel between the sides 38 and 39.

Figure 12:
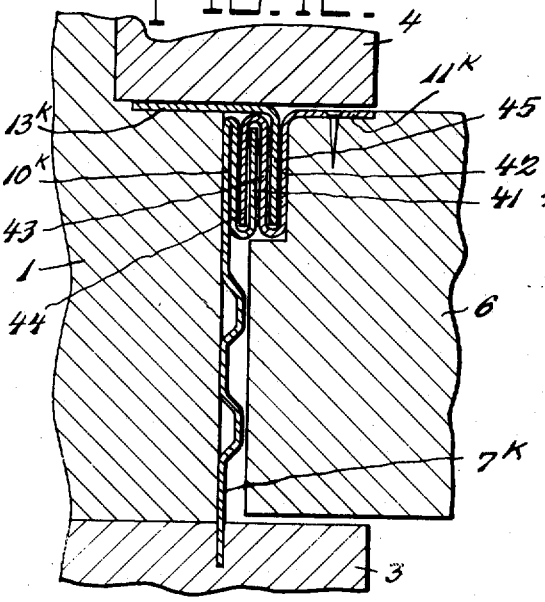

In Figure 12 the strip 7*k* is as before held in the window strip 3 and has its end 10*k* engaging the window frame and is bent flatly downwardly against itself and then upwardly to form the side 41, thus defining a U-shaped channel between this side 41 and the bent-over end portion 10*k*. As before, the weatherstrip member 11*k* is secured to the sash 6 and is bent down in engagement with the sash 6 forming the side 42 and is then bent upwardly forming the side 43, and then downwardly forming the side 44. The weatherstrip member 13*k* secured between the parting strip 4 and the window frame 1 is bent downwardly as shown at 45, this bent portion 45 projecting into the channel defined between the sides 42 and 43 of the weatherstrip element 11*k*, the upstanding member 41 of the weatherstrip member 7*k* being positioned within the inverted channel between the sides 43 and 44, the side 44 being in turn positioned within the channel formed between the members 41 and 10*k* of the weatherstrip element 7*k*.

Figure 13:
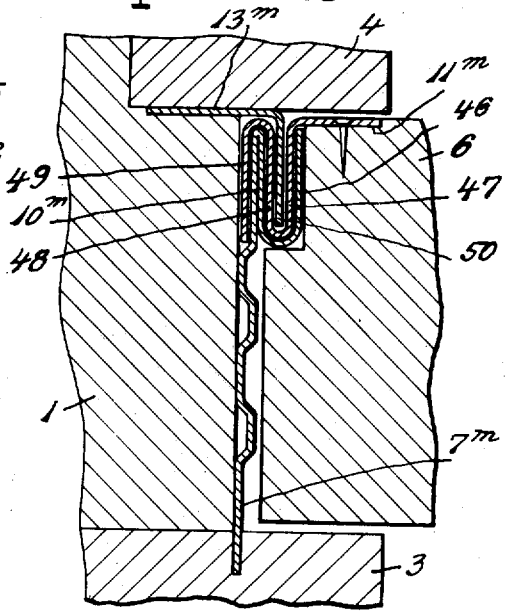

In Figure 13 the strip element 7*m* is as before engaged in the groove in the stop 3, and in this instance the end portion 10*m* is bent so as to be spaced away from the window frame 1 and is then bent downwardly upon itself and then upwardly to form the side 46, there being a relatively wide channel formed between the side 46 and the side 10*m*. As before, secured to the sides 6 of the window sash is the element 11*m* which is bent downwardly to form the side 47 and then upwardly to form the side 48, thus forming a channel which is enclosed by the channel between the sides 46 and 10*m* of the weatherstrip 7*m*. The element 11*m* is then continued, is bent downwardly to form the side 49, this side 49 being positioned between the end portion 10*m* of the weatherstrip element 7*m* and the window frame 1. Also, as before, positioned between the parting strip 4 and the window frame 1 there is the weatherstrip element 13*m* which extends inwardly and is bent downwardly at right angles to form the side 50, which is enclosed in the channel formed between the sides 47 and 48 which sides are also enclosed between the sides 46 and 10*m* of the weatherstrip element 7*m*.

Figures 14 and 15 show a type of installation somewhat similar to that illustrated in Figures 6 and 7 in that, as in these aforesaid figures, the installation is made in a plane at right angles to the installation of Figures 8 to 13 inclusive.

In Figure 14 the weatherstrip element 7*n* is held in the window stop 3 and is bent inwardly as shown at 10*n*, then upwardly and outwardly to form the side 51. Again secured to the sash 6 is the weatherstrip 11*n* which extends outwardly and is then bent inwardly to form the side 52, and then downwardly and outwardly to form the side 53. The portion 51 of the weatherstrip element 7*n* extends into the channel formed between the side 11*n* and the side 52 thereof, there being a channel between the sides 52 and 53 of the element 11*n* which receives the side 54 of the weatherstrip element 13*n* which now is frictionally held in a groove in the parting strip 4. The zone 10*n* of the member, in this assembly plays the part of a protective housing possessed of the virtues enumerated in the description of Figure 6.

In Figure 15 the weatherstrip element 7*o* is, as before, held in the groove in the window stop 3 and has its end 10*o* bent inwardly, then downwardly, and outwardly to form the side 55. In this modification the weatherstrip element 11*o* is secured to the sash 6 between the sash and the window frame 1 and projects inwardly as shown at 56, which portion is bent flatly back upon itself at 57 and then upwardly and inwardly as shown at 58. Again positioned between the parting strip 4 and the window frame 1 is the weatherstrip element 13*o* which projects inwardly and is bent downwardly as shown at 59 and then outwardly at 60 to form a U-shaped channel enclosing the remaining weatherstrip construction. The portion 55 of the weatherstrip element 7*o* is disposed in the channel formed between the sides 57 and 58 of the weatherstrip element 11*o*, this entire construction being enclosed by the sides 13*o*, 59 and 60 of the aforesaid weatherstrip member 13*o*. As distinguished from the assemblies of Figures 6, 9 and 14, the strip 13*a* herein acts as a protective housing rather than the part 10*a*; however, the desired end, as outlined in the description of Figure 6, is efficiently accomplished.

In Figure 16 there is shown in perspective one form of the weatherstrip member generally designated at 7 in the above description, its projections 8 being adapted in each case to bear against the window sash, thus lessening friction on the window frame and preventing rattling of the sash. The configuration of a convenient channel in which this strip element 7 terminates is indicated at the bend 10 relatively adjacent one end of the strip 7 and the side 61.

In the above description, it will become apparent that the present invention is composed of a three-part window strip, one part of which is secured within a window stop, a second part of which is secured to the window sash by a nail or screw or similar fastening means, the third part being held frictionally or otherwise within the parting strip 4, either within the parting strip itself, or between this parting strip and the window frame, these parts being closely cooperative to close the joints between the window stop and the frame to prevent entrance of air therein.

The strip itself is obviously very easily installed requiring a minimum amount of work on the sash. In some instances the efficiency and simplicity of installation may be increased by using one type of strip for the upper sash and another type of strip for the lower sash, conditions of the window construction where the installation is being made being the determining factor in this instance, as will be obvious to anyone familiar with installing weatherstrips. The strip does not interfere in any way with the removal of the sash for repairing the sash cord or the sash, nor does the groove in the sash for the pulley cord interfere in any way with the efficiency of the strip, since the continuity of the strip is not interrupted anywhere; being installed in the corner and being protected by the parting strip, it is virtually impossible to damage the strip, and further there is no danger of its catching on the pulleys or the sash cord. It will also be seen that each of the illustrated forms provides at least five passages through which the air must travel to get behind the window with the exception of the form shown in Figure 3, which form, while generally satisfactory does not give quite as much protection as the other forms herein illustrated and described. Its simplicity and ease of installation however render it meritorious. In the case where there are five passages for the air, there will be four complete reversals of direction that the elements must pass through before entering the house, thus giving maximum protection with a minimum amount of metal.

The three-part weatherstrip construction herein provided by me may under some conditions be modified in its use by employing sub-combinations of the three-part structure. In other words, I may, under certain conditions, employ two of the three parts and obtain efficient weatherstrip construction though not as efficient as when I utilize the three parts complete. Thus, in Figure 1, the strip member 13 may be omitted from the assemly or combination of parts and the remaining parts 7 and 11 in their cooperative relation will afford a fairly effective weatherstrip device useful under certain conditions of service. For another illustration, I refer to Figure 9, wherein it will be apparent that the weatherstrip member 10H—26 may be omitted and the remaining weatherstrip members 13H—29 and 11H—27 will afford a two-part weatherstrip effectively useful as such even though of less efficiency than the three-part strip. Of course, when the parts are arranged as last described, I do not have the advantage of the use of the housing portion that is employed in conjunction with the member 10H. Or again, as to the construction in Figure 9, I may omit the weatherstrip member 13H—29 and the remaining two members have effective sealing cooperation and will provide a very efficient two-part weatherstrip. The last described modification in principle may be adopted for the constructions in Figures 6, 13, and 14, and the remaining two-part strip will be a useful construction, as obvious from the foregoing. In Figures 7 and 15 the frame member may be omitted and the member that fits along the parting strip and interlocks over the sash member then forms the protective housing.

In mounting my weatherstrip construction of the window frame and sash member, it is of special importance to note that I obtain an ease of mounting that is not to be found in certain prior constructions; for instance, I point to those constructions as shown in Figures 1, 2, 3, 4, 5, 8, 9, 10, 11, 12 and 13 wherein the groove member in the sash is of considerable depth and extends toward the stop 3 and lies between the parting strip 4 and said stop. It will be observed from these views that the sealing portions of the weatherstrip construction lie in this groove and are pointed, so to speak, toward the parting strip 4 or toward the stop 3. Now in assembling this construction, the strip member that lies between the frame and sliding sash, and is anchored in stop 3, may be positioned first, and then the sash or frame member mounted in place, the manner in which the parts cooperate determining the next part to be mounted; however, usually the second part mounted is the member tacked to the sliding sash whereupon the third member may be mounted in cooperation with the other two parts with its attaching portion lying in the notch provided in the parting strip groove. The parting strip may then be mounted in position to grip the attaching portion of the third member between it and the frame to anchor the whole construction.

It will be also apparent that the invention is capable of many modifications without departing from the inventive concept. It is understood that it is intended and desired to embrace within the scope of this invention such modifications and changes as may be necessary to adapt it to varying conditions and uses.

Having thus described my invention, what I claim as new and desire to secure by Letters Patent of the United States, is—

1. A window construction comprising the combination with a window frame, a window stop, a parting strip and a window sash intermediate the parting strip and stop, of a three part weatherstrip comprising a member frictionally held adjacent one end within the stop and positioned intermediate the window frame and sash and forming a guide for the sash, a second weatherstrip member secured to the sash and bent at right angles in engagement with the sash, then bent again to form a U-shaped channel and bent a third time to form an inverted U-shaped channel enclosing the first member adjacent its other end and being disposed between the said first member and the window frame, and a third weatherstrip member movably secured between the window frame and parting strip, and having a portion thereof projecting into the aforesaid U-shaped channel.

2. A window construction comprising the combination with a window frame, a window stop, a parting strip, and a window sash intermediate the parting strip and stop, of a three part weatherstrip comprising a member intermediate the window frame and sash and forming a guide for the sash, a second member mounted upon the sash in contacting relationship with the aforesaid member, and a third member slidably arranged between the window frame and parting strip adapted to engage the member mounted upon the sash.

3. A window construction comprising the combination with a window frame, a window stop, a parting strip, and a window sash intermediate the parting strip and stop, of a three part weatherstrip comprising a member intermediate the window frame and sash, the member being slidably mounted within the window stop, the said member being provided with outstanding portions forming guides for the sash, the remaining portions of the member engaging the window frame, a second window strip member mounted upon the sash and contacting with the aforesaid member, and a third member slidably arranged between the window frame and parting strip adapted to engage the member mounted upon the sash.

4. A window construction comprising the combination with a window frame, a window stop, a parting strip and a window sash intermediate the parting strip and stop, of a three part weatherstrip comprising a member intermediate the window frame and sash and forming a guide for the sash, a second member mounted upon the sash in contacting relationship with the aforesaid member, and a third member movably positioned between the parting strip and the window frame and being adapted to adjust itself when expansion and contraction between the sash and frame takes place.

5. A window construction comprising the combination with a window frame, a window stop, a parting strip, and a window sash intermediate the parting strip and stop, of a three part weatherstrip comprising a member frictionally held at one end within the stop and positioned intermediate the window frame and sash and forming a guide for the sash, the said member being bent adjacent its other end to form a channel of inverted U-shape, a second weatherstrip member secured to the sash and bent at right angles in engagement with the sash and then bent again to form a U-shaped channel, then bent flatly back upon itself to form a double bend, and then a fourth time in a direction parallel to the double bend to form therewith a second U-shaped channel, the bent portion of the first member being enclosed in this U-shaped channel, and a third weatherstrip member movably secured between the window frame and parting strip and being bent to have a portion thereof projecting into the first of the aforesaid U-shaped channels.

6. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash to form a guide for the sash, the said member being bent adjacent its other end so that the bent portion lies adjacent the sash, a second weatherstrip member secured to the sash and bent at right angles to form a portion overlying the said bent end portion of the first member, the said second member then being bent to form a substantially U-shaped channel, and a third weatherstrip member secured between the window frame and the parting strip and being bent to have a portion thereof enclosed in the said U-shaped channel.

7. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash to form a guide for the sash, the said weatherstrip member being bent adjacent its other end so as to have a portion lying adjacent the said sash, a second weatherstrip member bent substantially at right angles and having a portion overlying the said bent-in portion of the first mentioned weatherstrip part, and a third weatherstrip member secured between the window frame and parting strip and being bent to form a portion positioned intermediate the said bent portion of the second member and the window frame.

8. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member being bent at a point adjacent its other end to form a portion lying adjacent the said sash, a second member secured to the said sash and being bent downwardly to overlie the bent portion of the first member and then being bent doubly back upon itself, and then bent a third time to form an inverted U-shaped channel, and a third weatherstrip member secured between the window frame and parting strip and having a portion thereof bent at substantially right angles and then bent again to form a U-shaped channel, the sides of which U-shaped channel interlock with the sides of the said inverted U-shaped channel.

9. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member being bent adjacent its other end to project horizontally into the sash and then outwardly to form a laterally reclining U-shaped channel, a second weatherstrip member secured to the sash and extending between the said sash and parting strip and then bent inwardly to project horizontally into the sash and then outwardly to form a second U-shaped channel within the first U-shaped channel and substantially registering therewith, and a third weatherstrip member secured between the window frame and parting strip and having a portion thereof extending within the said second U-shaped channel.

10. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, and being bent at substantially right angles at a point adjacent its other end to project horizontally to the sash, a second weatherstrip member secured to the sash, intermediate the sash and window frame, and bent to project horizontally into the sash and then being bent outwardly to form a U-shaped channel enclosing the bent portion of the first member, and a third weatherstrip member secured between the window frame and parting strip and projecting horizontally into the window sash and being then bent to form a U-shaped channel enclosing the other U-shaped channel of the second member and the bent portion of the first member.

11. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member having its other end bent flatly upon itself and positioned intermediate the sash and frame but spaced apart therefrom, a second weatherstrip member secured to the sash and bent at substantially right angles in engagement with the sash and then bent again to form a U-shaped channel member, said second member being then bent a third time to form an inverted U-shaped channel member enclosing the bent-in portion of the said first member, and a third weatherstrip member secured intermediate the parting strip of a window frame and having a portion bent to enter the said U-shaped channel of the second weatherstrip member, the bent portion of the said third member being bent again flatly upon itself to closely fill the said U-shaped channel.

12. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member being bent flatly back upon itself at a point adjacent its other end and then being bent again to form a side adjacent the sash to define a U-shaped channel, a second weatherstrip member secured to the sash and being bent to form a U-shaped channel enclosed within and registering with the first U-shaped channel of the first mentioned member, the third weatherstrip member secured between the parting strip and frame and being bent to have a portion entering into and enclosed by the said second U-shaped channel of the second weatherstrip member to substantially completely fill the space of the channel.

13. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, and having a portion toward its other end bent to occupy a space substantially midway between the said sash and frame, a second weatherstrip member secured to the sash being bent in one direction adjacent the first strip and then again to form a U-shaped channel, the said member being bent a third time to form an inverted U-shaped channel enclosing the bent portion and the first member, and being substantially filled thereby, and a third weatherstrip member bent to produce and substantially fill the U-shaped channel of the second member and then being bent to form an inverted U-shaped channel enclosing and substantially engaging the inverted U-shaped channel of the second member.

14. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member having a portion bent back upon itself and then bent again to form a U-shaped channel member, one side of which rests adjacent the said sash, a second weatherstrip member secured to the sash being bent to form a U-shaped channel, and then an inverted U-shaped channel enclosing and substantially registering with the bent portions of the said first member, and a third weatherstrip member bent to interengage with and be enclosed by the said U-shaped channel with the second member.

15. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member extending adjacent the window frame to a point closely adjacent the parting strip and then being bent flatly upon itself and bent again to form a U-shaped channel, a second weatherstrip member secured to the window sash and being bent to form a U-shaped channel and an inverted U-shaped channel interlocking with the U-shaped channel of the first member, and a third weatherstrip member secured between the window frame and parting strip and being bent at right angles to form a portion projecting into and enclosed by the U-shaped channel, the said third weatherstrip member substantially filling the space between the said parting strip and the other two members.

16. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, and having a portion bent flatly back upon itself and then bent again to form a U-shaped channel, one side of which engages with said sash, a second weatherstrip member bent to register and be enclosed within the convolutions of the first member, and a third weatherstrip member positioned between the window frame and parting strip and having a portion bent to project between adjacent bends of the said second member.

17. A window construction comprising the combination with a window frame, a window stop, a parting strip, and a window sash intermediate the parting strip and stop, of a three part weatherstrip comprising a member frictionally held adjacent one end within the stop and positioned intermediate the window frame and sash and forming a guide for the sash, the said member having a bent portion projecting horizontally into the window sash and being bent again to form a U-shaped channel, a second member secured to the sash and being bent to form a U-shaped channel within the U-shaped channel of the first member and having its bends interlocking with the said first member, and a third weatherstrip member slidably mounted in the parting strip and projecting between the convolutions of the said second member to closely interengage therewith.

18. A window construction comprising the combination with a window frame, a window stop, a parting strip, and a window sash intermediate the parting strip and stop, of a three-part weatherstrip comprising a member frictionally held adjacent one end within the stop and positioned intermediate the window frame and sash and forming a guide for the sash and having a portion bent to project horizontally into the said window sash, a second weatherstrip member secured to the sash intermediate the sash and frame and being bent to form a U-shaped channel interengaging with the U-shaped channel of the said first member, and a third weatherstrip member secured between the parting strip and the window sash and projecting horizontally into the said window sash and being bent into a U-shaped channel enclosing the convolutions of the said first two members.

19. In combination with a window sash and frame, a weatherstrip assembly including a pair of strip members, one of which is attached to the sash, the other of which is attached to the frame, cooperating sealing surfaces on said members, and a third member forming a housing enclosing said sealing members at least in part.

20. In combination with a window sash and frame, a weatherstrip assembly which includes a pair of strip members, one of which is mounted on and movable with the sash, the other of which is mounted on the frame and immovable with respect to the up and down movements of the sash, sealing surfaces on said members, at least two of which are adapted to cooperate to form a seal, and means for enclosing said first two members at least in part, said means having a sealing surface cooperating with a sealing surface on one of said first named members.

21. In combination with a window frame and relatively movable sash having a groove portion, a multi-part weatherstrip assembly including a pair of strip members for mounting on the sash and frame respectively, lying at least in part in said groove portion, sealing surfaces on said members, and a housing for said members encompassing the sealing surfaces thereof, said housing having a surface for sealing engagement with a sealing surface on said sash member.

22. In a multi-part weatherstrip construction of the class described for window assemblies having a movable sash and immovable frame, a strip member for mounting on the sash, a strip member for mounting on the frame, sealing surfaces on said strip members for sealing cooperation, a third member forming a housing coextensive with said sealing members and normally enclosing the sealing surfaces of both strips when the sash is in one position of adjustment, and normally enclosing the sealing surface of one of the members when in another position of adjustment.

23. In combination with a window sash, frame and parting strip, a multi-part weatherstrip assembly including a strip member attached to and movable with the sash, a second strip attached to the frame, sealing surfaces on said members, and a third member having a part located between the parting strip and frame and having a portion enclosing the sealing surfaces of the first named strips.

24. A multi-part weatherstrip construction for window assemblies having a sash provided with a groove, frame, parting strip, and stop which includes a strip member having an attaching portion lying in part between the sash and frame and having an end zone anchored in the stop, a portion turned upon itself and then in a reverse direction to form a U lying in the groove of the sash, a second member mounted in the sash and having its end portion turned to provide a U for nesting relation with the U of the first named member, the open ends of the said U's lying in the direction of the parting strip.

25. A window construction comprising the combination with a window frame, a window stop, a parting strip, and a window sash intermediate the parting strip and stop, of a multi-part weatherstrip assembly comprising a member intermediate the window frame and sash, a member mounted on the sash in contacting relation with the aforesaid member, and another member positioned between the parting strip and window frame contacting with one of said first named members, said members being of such a nature that cooperation between two members produces a seal between the window frame and sash.

26. A weatherstrip construction for use in connection with window frame and sash members, which comprises three interlocking members adapted to be interposed between the window frame and sash, said members having sealing surfaces thereon for cooperation to produce a seal between the frame and sash.

27. In combination with a window construction including a window frame, a sliding sash, a stop, and a parting strip, said sliding sash having a cut-away portion therein and forming with the frame a deep groove lying between the parting strip and stop, the direction of its depth being toward the stop, a multi-part weatherstrip construction comprising a member lying between the frame and sash and having a part thereof lying in the zone of the groove, a second member having a portion lying between the parting strip and frame and having a part lying within the zone of the groove and cooperating with the part of the first named member lying therein, and a third member mounted on the sash and having a part lying between the sash and parting strip and having a part lying within the groove and cooperating with at least one of the parts of the aforementioned members which lies within the groove, said parts lying within the groove cooperating to form a seal between the window frame and sash.

28. A window construction comprising the combination with a window frame, a window stop, a parting strip, and a window sash intermediate the parting strip and stop, of a multi-part weatherstrip assembly which includes a member mounted on the window frame, a second member mounted upon the sash and movable therewith and in contacting relationship with the first named member, and another member immovably positioned with respect to the first two named members for all up and down movements of the sash and in contacting relationship with one of the first named members, said assembly being of such a construction that cooperation between two of the members is effective to produce a seal between the window and the sash.

29. In combination with a window frame and sash, a multi-part weatherstrip construction including, in combination, a strip member normally immovable with respect to the sash for raising and lowering movements of the sash, having a portion bent upon itself and then bent again to form an open U having one leg lying closely adjacent the sash, the inner surface of said open U forming a sealing surface, a second member attached to the sash and movable therewith for raising and lowering movements, said member having a portion bent to form a U, the outside surface of the U cooperating with the inside surface of the U of the first named member to form a seal therebetween, the U-shaped portion of the first named member forming a housing for receiving a protective coating on its outer surface and enclosing the second named member at least in part.

ELMER D. BARRINGER.